R. S. MacEWAN.
GASKET FOR HOSE COUPLINGS.
APPLICATION FILED MAY 24, 1909.
947,645.  Patented Jan. 25, 1910.
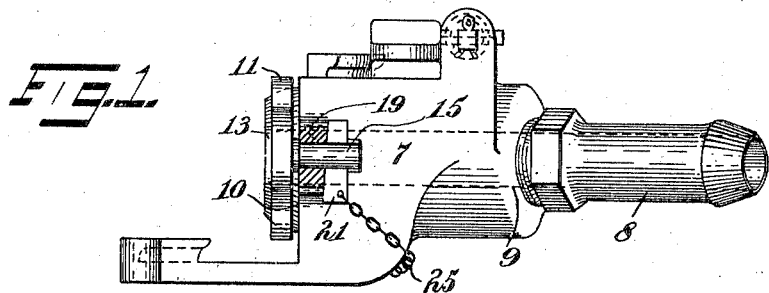
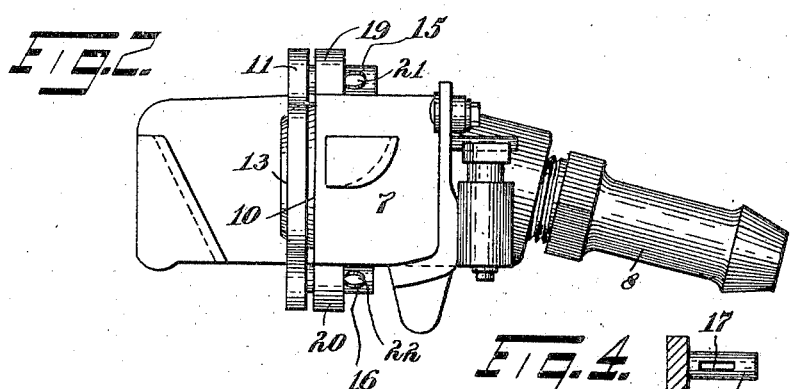
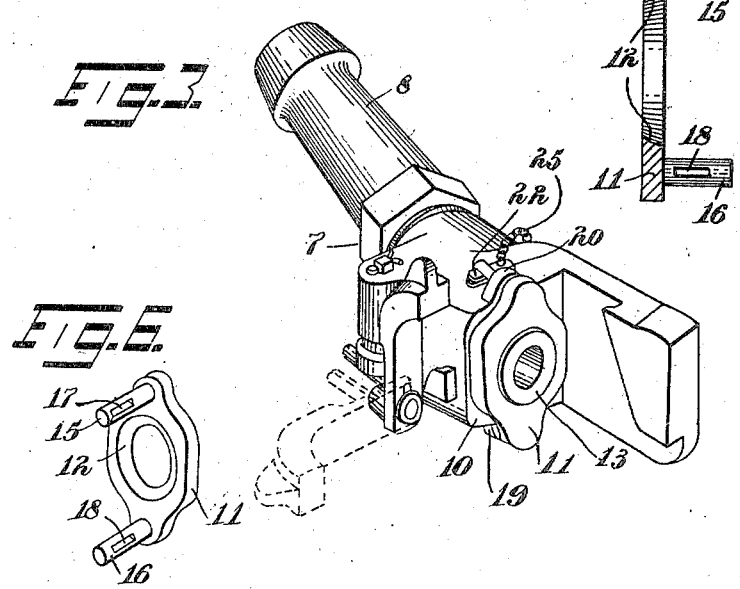
Witnesses:
S. Krumann
H. D. Penney
Inventor:
Robert S. MacEwan,
By his Attorney, F. H. Richards.

UNITED STATES PATENT OFFICE.

ROBERT S. MacEWAN, OF TROY, NEW YORK.

GASKET FOR HOSE-COUPLINGS.

947,645.  Specification of Letters Patent.  Patented Jan. 25, 1910.

Original application filed April 9, 1908, Serial No. 426,028. Divided and this application filed May 24, 1909. Serial No. 497,884.

*To all whom it may concern:*

Be it known that I, ROBERT S. MACEWAN, a citizen of the United States, residing in Troy, in the county of Rensselaer and State of New York, have invented certain new and useful Improvements in Gaskets for Hose-Couplings, of which the following is a specification.

This invention relates to fluid pressure hose couplings especially designed for effecting the connection between the hose of two adjacent cars.

The object of the invention is to provide an improved form of packing member or gasket, and gasket carrier, to produce a fluid tight coupling between two head members.

This application is a division of patent to applicant granted June 8th, 1909, No. 924,166.

In the accompanying drawings illustrating one embodiment of my invention, Figure 1 is a plan view of a coupling head and gasket. Fig. 2 is a side view of the same. Fig. 3 shows the device in perspective. Fig. 4 is a longitudinal section through the gasket carrier. Fig. 5 is a longitudinal section through the gasket, and Fig. 6 shows the gasket carrier in perspective.

The head is denoted generally by 7 and may be connected with the hose by the pipe 8. As will be understood, there are always a pair of these, one at each end of the car, that are duplicates, and only one is illustrated. The head is provided with the usual bore 9 connecting with the pipe 8, and having an outlet in the face 10 of the head. It is this face that coöperates the similar face of the head on the next car, and to form a fluid tight joint, where the connections are used for steam, or air, or other gas under pressure, it is customary to attach a gasket or washer around the bore at this face; I provide a gasket carrier 11 of annular shape, shown separately in Figs. 4 and 6, whose bore has its wall 12 formed tapering, and preferably spherical or ball-shaped. The gasket 13 is shown separately in Fig. 5, has its periphery 14 also tapering, and preferably correspondingly ball shaped, with opposite parallel sides. The gasket is preferably of a diameter to extend a short distance through the bore of the carrier 11, as shown in Figs. 1 and 2, whereby it can be tightly clamped against the face 10 of the head, without the carrier engaging such face. And the gasket projects partly through the carrier to engage the corresponding portion of the gasket on the other head, with which it coöperates.

Suitable means are provided for removably securing the gasket carrier 11 to the face 10 of the head in order to press the gasket tightly against the face around the bore 9, and retain it in position; which means can be very readily and quickly released to permit removal of the gasket, for insertion of a fresh one when the gasket becomes worn. Means are shown in the nature of two projecting pins on one of these two members extending substantially perpendicular to the face 10 of the head, which projections or pins enter apertured ears on the other member, and are locked therein to press the gasket against the face and removably secure it in position. These pins are preferably provided with slots into which keys or wedges are driven to press the gasket tightly against this face and lock it in position.

The carrier 11 is shown as provided with two oppositely disposed pins 15 and 16 preferably perpendicular to the frame, and provided with slots 17 and 18 extending longitudinally of the pins. The head 7 is shown as provided with apertured ears 19 and 20 through which the pins 15 and 16 project. These ears preferably are located at the two opposite side faces of the head as shown, and lie in a plane parallel to the engaging face 10. The slotted portion of the pins will extend beyond the ears, and permit the insertion of keys 21 and 22. The keys, or the engaging portions of the ears, may have inclined faces, or preferably both as shown in Fig. 1, whereby the carrier will be forced toward the face 10 by the wedging action of the keys when inserted and driven into position. The engaging tapering or ball-shaped faces of the carrier and gasket will cause a kind of ball-and-socket engagement to press the gasket tightly against the head on all sides, and to securely hold the gasket in position.

It will be understood that the gasket is very readily attached by merely inserting the gasket in the carrier, placing the pins in the ears, and inserting the wedges and driving them home, by any kind of a device that will act as a hammer; that will very quickly and very securely lock the gasket in proper position. To remove the gasket to substitute a fresh one, it is only necessary to drive out the wedges, and for this purpose no tools whatever are needed beyond a single implement or device of any nature that can act as a hammer. The wedges are simply driven out of the pins, when the carrier and gasket can be quickly removed. To prevent misplacement of the wedges they may be connected with the head by any suitable means, such as chain 25.

Having thus described my invention, I claim:

1. The combination of a head having a bore leading inward from one face, a gasket carrier having a pair of slotted pins extending substantially perpendicular to its attaching face, the head having on two opposite sides an apertured ear adjacent the said face containing the bore with the apertures arranged to receive the said pins on the carrier, wedges located in the slots in the said pins, a gasket clamped to said face by the carrier, and the gasket and the carrier having ball-shaped engaging faces.

2. The combination of a head having a bore leading inward from one face, a gasket carrier having a pair of slotted pins extending substantially perpendicular to its attaching face and having a ball shaped bore, the head having on each of two opposite sides adjacent said face an apertured ear, which apertures are arranged to receive the said pins on the carrier, a gasket having a ball shaped face on its periphery for engagement with the ball shaped face of the carrier, wedges located in the slots in the pins causing the carrier to clamp the gasket against the said attaching face, the gasket projecting beyond the carrier on both of its faces.

ROBERT S. MacEWAN.

Witnesses:
HENRY MALCOLM,
JOHN A. LECKIE.